G. HALLOCK.
CHALK LINE HOLDER.
APPLICATION FILED MAR. 16, 1910.
982,000.
Patented Jan. 17, 1911.
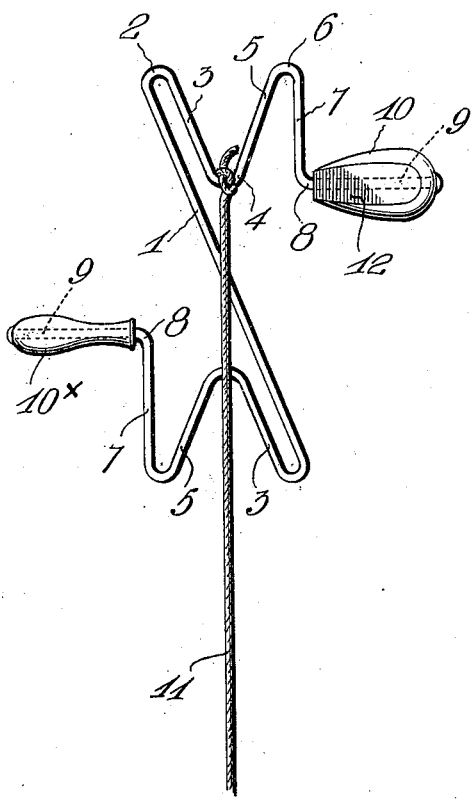
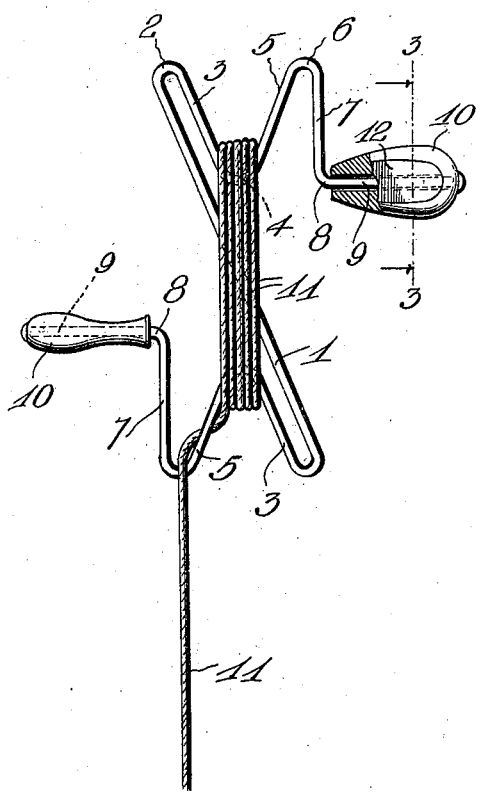
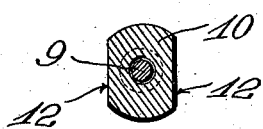
Witnesses
Inventor
George Hallock

UNITED STATES PATENT OFFICE.

GEORGE HALLOCK, OF SULTANA, CALIFORNIA.

CHALK-LINE HOLDER.

982,000. Specification of Letters Patent. Patented Jan. 17, 1911.

Application filed March 16, 1910. Serial No. 549,744.

*To all whom it may concern:*

Be it known that I, GEORGE HALLOCK, a citizen of the United States, residing at Sultana, in the county of Tulare and State of California, have invented certain new and useful Improvements in Chalk-Line Holders, of which the following is a specification.

This invention relates to chalk line holders and one of the principal objects of the same is to provide a simple, reliable and efficient device for reeling and unreeling a chalk line, said reel being provided with means whereby it may be suspended after the amount of line has been paid out without unreeling any more of the line.

Another object of the invention is to provide a chalk line reel or holder composed of a single length of wire of the proper gage and provided with oppositely disposed handles to rotate the reel, said reel and handles lying substantially flat when placed upon a roof or other inclined place without danger of sliding off.

Still another object of the invention is to provide a simple chalk line holder which will operate quickly for reeling or unreeling the line and which when properly reeled up will hold the end of the line from disconnection with the reel, and to prevent the line unwinding accidentally.

These and other objects may be attained by means of the construction illustrated in the accompanying drawing, in which—

Figure 1 is a view in elevation of a chalk line holder and reel made in accordance with my invention, the chalk line being entirely unwound from the reel. Fig. 2 is a similar view showing the rotating handles in section and a portion of the chalk line wound upon the reel. Fig. 3 is an end view of one of the rotating handles.

Referring to the drawing it will be seen that the chalk line holder and reel is made from a single length of wire of the required gage, and that this wire is provided with a central connecting member 1 bent at 2 to form a member 3, said member being bent at 4 to form a diverging member 5. The latter is bent at 6 and is extended to form the portion 7 which is bent outward at 8 at substantially right angles to form the outwardly extending bearing for the rotary handle 10. It is to be noted that the members 3 and 5 form a V-shaped holder for a quantity of chalk line 11.

Formed upon the opposite end of the connecting member 1, is a holder for the chalk line similar to that already described. The handle 10$^x$ is secured to the outwardly extending portion 9 at this end of the reel. The handle 10 upon the opposite end of the reel may be formed of any suitable material, and as shown, said handle is provided with flat sides 12.

The operation of my invention may be briefly described as follows: To reel up the chalk line the handles 10 and 10$^x$ are grasped one in each hand and by a rotary motion the chalk line is rapidly reeled between the members 3 and 5 at opposite ends of the connecting member 1. When all or a portion only of the line is to be paid out, the line is passed between the members 5 and 7, as shown in Fig. 2, to prevent any further unwinding, even if the holder is suspended.

Owing to the construction of the flattened handle 10 the chalk line holder will not roll off a roof or other inclined place. Moreover the holder can be placed in a pocket in a workman's overalls and occupies but little space, being perfectly flat.

My invention can be manufactured at low cost, is strong, durable and efficient in use and cannot readily get out of order.

Having thus fully described the invention what is claimed as new is:

The herein described chalk line holder comprising a reel formed from a single strand of wire and having oppositely diverging reel members, the terminals of said wire strand being bent outwardly in opposite directions, said reel members and outwardly bent terminals lying in substantially the same plane, a handle member having flattened sides rotatably mounted upon one of said terminals to prevent the chalk line holder from rolling off a roof or other inclined place, and a rounded handle mounted upon the other terminal.

In testimony whereof I affix my signature in presence of two witnesses.

GEORGE HALLOCK.

Witnesses:
  W. L. CARMICHAEL,
  H. FLOWERS.